C. A. STUTZMAN.
ANIMAL TRAP.
APPLICATION FILED APR. 9, 1917.
1,242,737.
Patented Oct. 9, 1917.
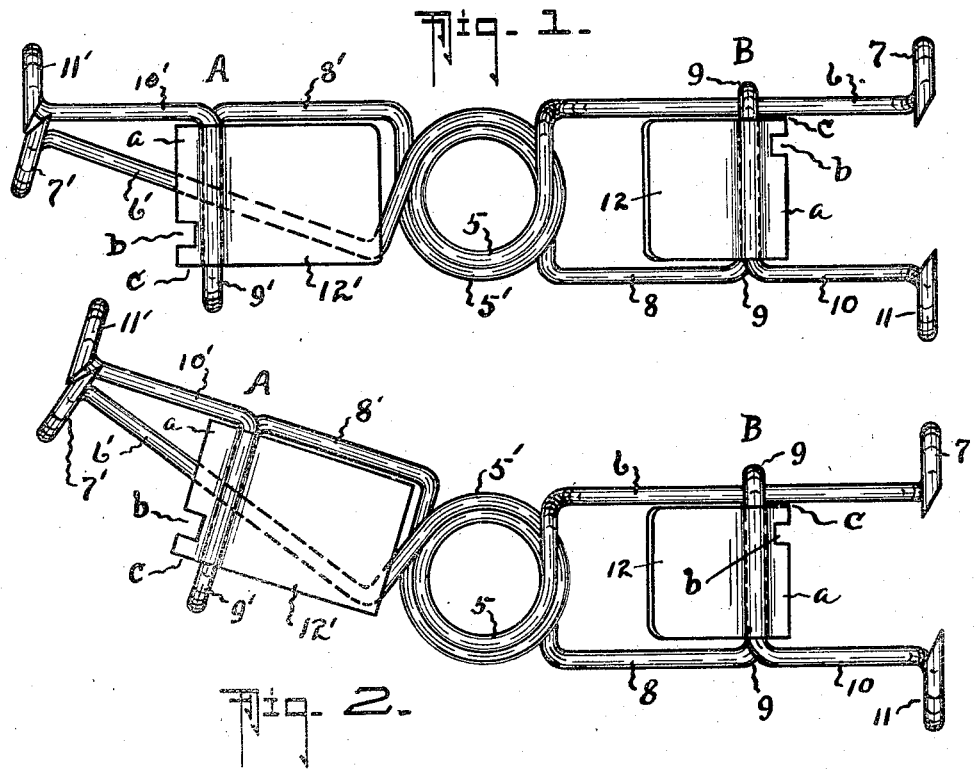
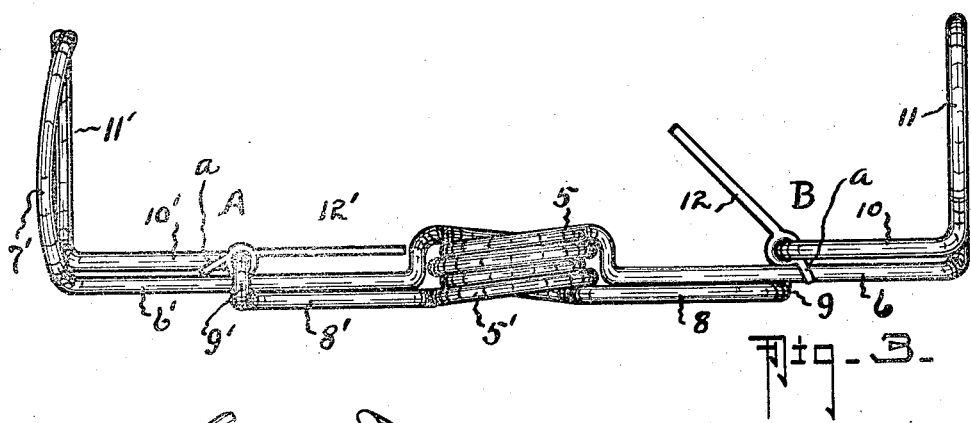
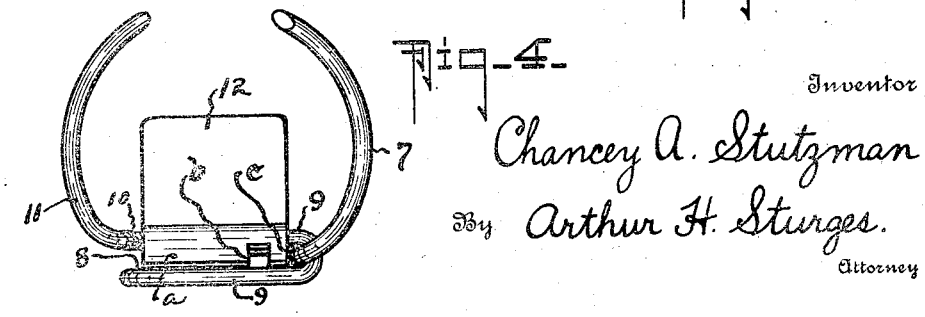
Inventor
Chancey A. Stutzman
By Arthur H. Sturges.
Attorney

UNITED STATES PATENT OFFICE.

CHANCEY A. STUTZMAN, OF HARLAN, IOWA, ASSIGNOR OF ONE-HALF TO CLARENCE F. VANATTA, OF HARLAN, IOWA.

ANIMAL-TRAP.

1,242,737.   Specification of Letters Patent.   Patented Oct. 9, 1917.

Application filed April 9, 1917. Serial No. 160,596.

*To all whom it may concern:*

Be it known that I, CHANCEY A. STUTZMAN, a citizen of the United States, residing at Harlan, in the county of Shelby and State of Iowa, have invented certain new and useful Improvements in Animal-Traps, of which the following is a specification.

This invention relates to an animal trap, adapted for use particularly in the capture of small fur-bearing animals, and when constructed of suitable proportions may be used to advantage as a gopher trap.

The invention consists of the novel construction, combination and arrangement of parts as described herein and claimed, and as illustrated in the accompanying drawing, wherein,—

Figure 1 is a plan view of the trap, one pair of jaws being set to an open position. Fig. 2 is a view similar to that shown in Fig. 1, one of the traps being disposed in angular relation to the other. Fig. 3 is a side view, and Fig. 4 is an end view of the trap.

The invention has reference to the provision of two connected traps, the connection being at their inner ends, the place of entrance being between two pairs of jaws at their outer ends, the arrangement of parts being such that when the trap is placed in the burrow, hole or passageway of the animal, it will be operative for a capture whether the animal is entering or leaving.

The important features relate to simplicity, convenience and economy in manufacture of the device, the arrangement of the coils or springs so that they will not be obtrusive; the rotatable connection of the two traps A and B at their inner ends so that the device may be laid in a curved passageway; adjustable features, so that the jaws may occupy larger or lesses areas, and adaptability for capturing animals moving in either direction of a passageway.

The device consists of two metallic, resilient strands to provide the frames of two traps A and B, said strands being bent midway between their ends to form two connected, coiled springs indicated, respectively, at 5 and 5', the coil 5 having a rectilinear arm 6 extending outwardly, substantially in the plane of the coil and curved upwardly to form a jaw 7 substantially at right angles to said arm, said coil also having an arm 8 opposite to the arm 6, said arm 8 being bent to form a loop 9 and providing an extension 10 substantially parallel with the arm 8, said extension being curved upwardly and inwardly to form a jaw 11 disposed substantially at right angles to said extension to coact with the jaw 7.

The coiled spring 5' also has a rectilinear arm indicated at 6' which extends outwardly in the plane of said coil and is curved upwardly and inwardly to provide a jaw 7' disposed at right angles to said arm 6'; and the spring coil 5' has an arm 8' opposite to the arm 6' which is bent to form a loop 9', said arm 8' also providing an extension 10' substantially parallel with the arm 8' and having curvatures upwardly and inwardly to form a jaw 11' to co-act with the jaw 7'.

The two strands mentioned form the frame work for the two traps, simply by bending the wire, metallic strip, rod, bar or strand of which a frame is constructed, the coiled springs 5 and 5' being connected simply by having their wires crossed, and the rectilinear arms 6 and 6' having such an inclination that the jaws of each pair will normally be disposed in closed relation when the trap is "sprung", as clearly shown in the drawing.

The upper part of each loop provides a pivotal mounting for the pair of triggers 12 and 12', said triggers being comparatively broad and flat and extending inwardly from the loops, and each being provided with a downwardly projecting lip *a* having a notch or recess *b* formed therein within which the arms 6 or 6' may engage, if desired, when the jaws are extended, and having an edge *c* with which said arms 6 or 6' engage when the jaws are fully extended.

In operation the device is placed in the burrow, hole or passageway where the animal to be caught, is liable to pass, both traps being set by moving the arms 6 and 6' outwardly as shown by the traps B. If the hole or passageway is comparatively small the arms 6 and 6' may be disposed in the recesses *b* the area thereby being limited, but ordinarily the arms are disposed in engagement with the edges *c* of the trigger, and it will be understood that an animal moving inwardly of the trap in either direction will cause the trigger to swing downwardly, the arm 6 or 6' thereby being released and moving under force of a spring to catch the animal between the jaws.

It will be noted that the arms 8 and 8' together with the lower part of the loops 9 and 9' provide a base for the device for a suitable support on the ground, the arms 6 and 6' working between the arms of the loops free from the ground, this being a desirable feature in operation, since the movements of the arms 6 and 6' will not be obstructed.

The device may be constructed of any desired size or proportion, depending upon the kinds of animals to be trapped, and while I have shown sharpened ends for the jaws this is not necessary in all instances and may be changed if desired since the space between the jaws when the trap is "sprung" is so limited that it will hold the animal. The animal will not be impaled by the ends, but will be held between the curved parts of the jaws.

Having fully described my invention, what I claim and desire to secure by Letters Patent is,—

In devices for the purpose described, a pair of resilient, metallic strands bent midway between their ends to form a pair of connected springs, each strand having a rectilinear part projecting outwardly from its spring and bent to provide a curved jaw disposed at substantially right angles to said rectilinear part, each strand being also bent to provide a second rectilinear part projecting outwardly from its spring adjacent to the first named rectilinear part and having a portion bent to a loop-form to partly circumscribe the first named rectilinear part and provided with a rectilinear extension having a curved jaw disposed substantially at right angles to said extension, a pair of triggers, each being arranged to swing on a part of a loop, each trigger being provided with a lip for engaging a first named rectilinear part when said part is extended.

In testimony whereof, I have affixed my signature in presence of two witnesses.

CHANCEY A. STUTZMAN.

Witnesses:
EMILY J. DAVIS,
W. E. COOPER.

Copies of this patent may be obtained for five cents each, by addressing the "Commissioner of Patents, Washington, D. C."